United States Patent
Feldman

[11] Patent Number: 5,938,706
[45] Date of Patent: Aug. 17, 1999

[54] MULTI ELEMENT SECURITY SYSTEM

[76] Inventor: Yasha I. Feldman, 225 Vandalia Ave., Apt. # 14C, Brooklyn, N.Y. 11239

[21] Appl. No.: 08/677,018

[22] Filed: Jul. 8, 1996

[51] Int. Cl.[6] ............................... G06G 7/76; H04L 9/00
[52] U.S. Cl. ............................... 701/32; 701/36; 380/21; 380/23; 340/825.31
[58] Field of Search .................... 701/300, 200, 701/1, 2, 24, 25, 28, 36, 32, 33; 340/825.48, 825.31, 988, 990, 995, 426, 825.49, 574, 514, 515, 539, 825.34, 425.5, 634; 342/357, 457, 368, 451; 380/23, 25, 49, 30, 50, 21

[56] References Cited

U.S. PATENT DOCUMENTS

| | | | |
|---|---|---|---|
| 4,706,072 | 11/1987 | Ikeyama | 340/576 |
| 5,229,648 | 7/1993 | Sues et al. | 340/825.31 |
| 5,334,974 | 8/1994 | Simms et al. | 340/990 |
| 5,351,781 | 10/1994 | Pritchard et al. | 180/287 |
| 5,481,253 | 1/1996 | Phelan et al. | 340/825.31 |
| 5,497,149 | 3/1996 | Fast | 340/988 |
| 5,515,043 | 5/1996 | Berard et al. | 340/988 |
| 5,517,199 | 5/1996 | DiMattei | 342/357 |
| 5,546,072 | 8/1996 | Creuseremee et al. | 340/574 |
| 5,587,715 | 12/1996 | Lewis | 342/357 |
| 5,619,573 | 4/1997 | Brinkmeyer et al. | 380/23 |
| 5,629,693 | 5/1997 | Janky | 340/988 |
| 5,641,032 | 6/1997 | Whitman | 180/287 |
| 5,648,763 | 7/1997 | Long | 340/825.49 |
| 5,661,451 | 8/1997 | Pollag | 340/426 |
| 5,682,133 | 10/1997 | Johnson et al. | 340/426 |
| 5,686,765 | 11/1997 | Washington | 180/287 |
| 5,708,712 | 1/1998 | Brinkmeyer et al. | 380/23 |
| 5,731,785 | 3/1998 | Lemelson et al. | 342/357 |

*Primary Examiner*—Jacques H. Louis-Jacques
*Attorney, Agent, or Firm*—Ilya Zborovsky

[57] ABSTRACT

A multi element security system for a vehicle and the like has a central processing unit for storing driver's fingerprint data and driver's image data, Fingerprints Entry a unit and photo image entry a unit connected with the central processing unit so that when a key ignition lock is inserted fingerprints data and photo image data of a person inserting the key ignition lock are transmitted to the central processing unit and compared with the stored data to determine whether the person inserting the key ignition lock is an unauthorized driver or not, a unit for connecting the central processing unit with a vehicle battery and a motor pump, so that the vehicle battery and the motor pump are operated only when it is determined that the person is the authorized driver, and a unit for transmitting data about the fingerprints and the photo image of the person to a designated place when it is determined that he is not the authorized driver.

2 Claims, 1 Drawing Sheet

MULTI ELEMENT SECURITY SYSTEM

BACKGROUND

1. Field of the Invention

This invention relates to a security system for a mobile piece of equipment such as a freight car, aircraft, boat, automotive/truck vehicle, or other machines that may be stolen.

2. Description of Prior Art

The Automotive Security System disclosed in U.S. Pat. No. 5,481,253 of Jan. 2, 1996, of Michael D. Phelan enables more vehicle elements to be controlled by electrical code vehicle operation lock. This invention cannot prevent vehicle stealing if all electrical controlled vehicle elements are jumped or shorted to be in operating conditions by a knowledgeable electrical specialist. This device cannot tell to the vehicle owner that his vehicle has been stolen, cannot give to the owner the vehicle location coordinates, and cannot give the thief's photo picture and fingerprints and notify police.

Another Invention is a Multi Element Security System, disclosed in U.S. Pat. No. 5,229,648 of Jul. 20, 1993, of John M. Sues makes an electrical marker on every vehicle device and enable to block vehicle operation if it does not match with an original vehicle manufacture marker. This device does not prevent the vehicle stealing, and does not help to find a stolen vehicle and does not give the thief's photo picture and finger prints to the police.

OBJECTS AND ADVANTAGES

Accordingly, several objects and advantages of my invention are to provide a Multi Element Security System which enables to prevent car stealing by giving authorization for vehicle operation only if a proper photo image and finger prints are entered into a vehicle security system. In case if the vehicle is stolen, the security system enables to notify the vehicle owner, police and traffic authority by giving the stolen vehicle location date, a photo image of a thief's and thief's fingerprints. Additional advantages of the security system are that it provides control for a vehicle tank entered gasoline quality and volume quantity to prevent unconditioned gasoline to be entered into the vehicle tank and gasoline short tanks entering in a car service station. The system enables to prevent gasoline stealing in on a vehicle parking lot or in garage.

SUMMARY OF THE INVENTION

In keeping with these objects and with others which will become apparent hereinafter, on feature of present invention resides, briefly stated in a Element Security System for motor vehicle, or boat, or aircraft, comprising: central processor unit for date managing and storage, a vehicle battery and a motor pump control units, a Fingerprints Entry Device for driver fingerprints data generating, a Photo Camera for driver photo image data generating, a Navigation Unit for generating vehicle location data. A Key Ignition Lock for Ignition control, A data Radio Transmitter for data transmitting, A data Radio Receiver for data receiving, Personal Computer for date storage, reading and printing, a Gasoline Quality Analyzer for tank entered gasoline quality control, a Gasoline Volume Sensor for tank existing a gasoline volume control, Gasoline Entry Volume Sensor for tank entering gasoline volume control, a Tank Cover Code Lock for tank access control.

DESCRIPTION OF A PREFERRED EMBODIMENT—DESCRIPTION

Figure 1:
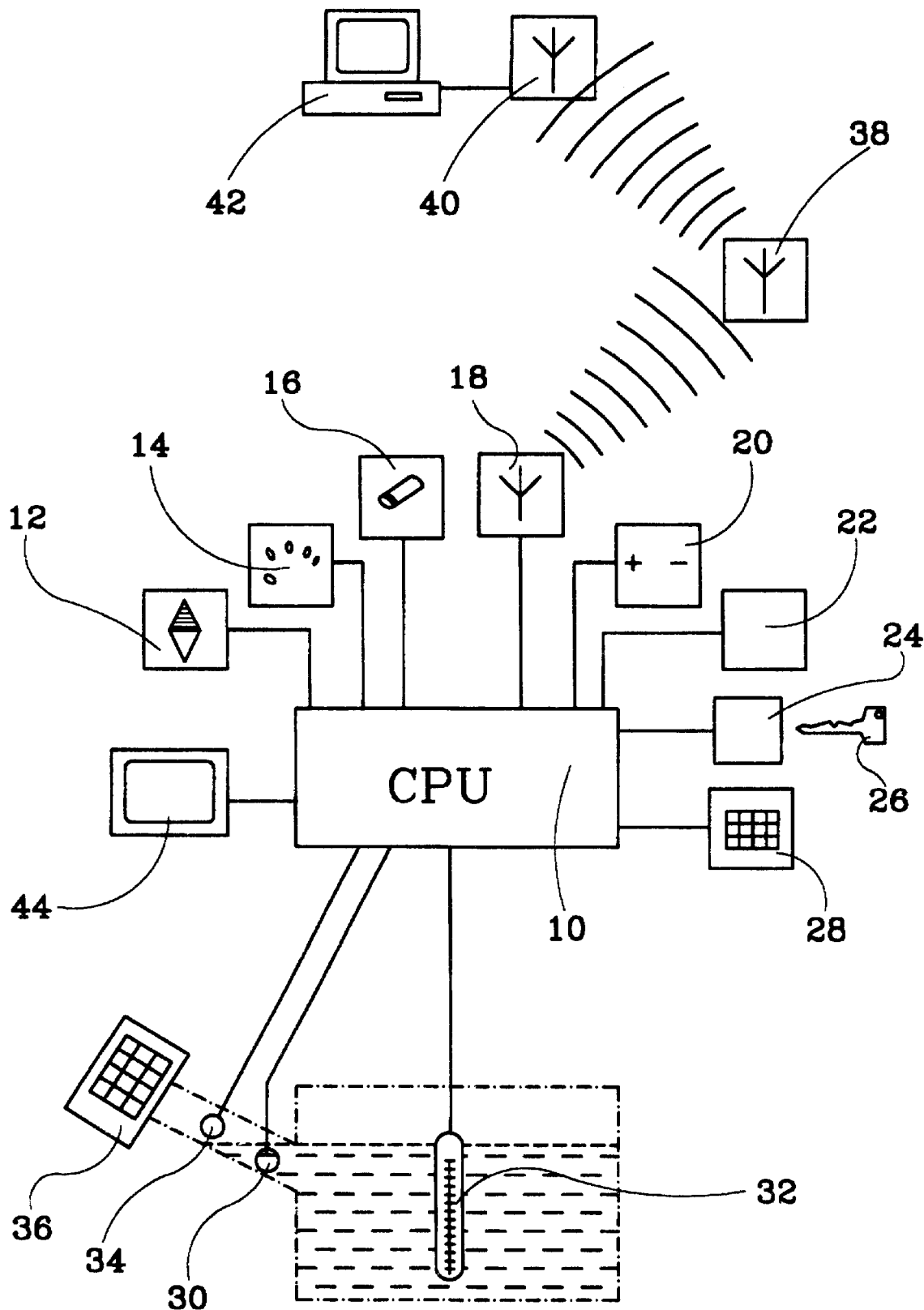
FIG. 1 is a block diagram of the subject system.

FIG. 1 show a block diagram of my new system. A Central Processor Unit 10 is connected by electrical wires with a Navigation Unit 12, a Fingerprints Entry Device 14, a Photo Camera 16, a Data Radio Transmitter 18, a Vehicle Battery 20, a Motor Pump 22, a Key Ignition Lock 24 with an Ignition Key 26, an Ignition Code Lock 28, a Gasoline Quality Analyzer 30, a Gasoline Volume Sensor 32, a Gasoline Entry Volume Sensor 34, a Tank Cover Code Lock 36. Data Radio transmitter communicates by radio waves with a Data Radio translator 38 and a Data Radio receiver 40 connected by electrical wires with a Personal Computer 42. Central Processor Unit 10 is connected by electrical wires with a Vehicle Information Display 44.

Operation of my Multi Element Security System is simple. When Ignition Key 26 is inserted in Key Ignition Lock 24 the Key Ignition Lock 24 generates and sends an electrical signal to Central Processor Unit 10. Ignition Code Lock 28 generates and sends an electrical signal when numeric code is entered in Ignition Code Lock 28. Fingerprints Entry Device 14 generates and sends electrical signal and photo image data to Central Processor Unit 10 when the vehicle is moving or Ignition Key 26 is inserted in Key Ignition Lock 24. Navigation Unit 12 generates vehicle location data and sends it to Central Processor Unit 10. Central Processor Unit 10 stored and operate data from all elements of the security system and give authorization to operate Vehicle Battery 20 and Motor Pump 22 when all entered data from all System elements are matched with the data stored in Central Processor Unit 10 Central Processor Unit 10 enables stored data of many vehicle drives as needed. If improper data are entered in any System device, the Central Processor Unit 10 blocks Vehicle Battery 20 and Motor Pump 22 and the vehicle cannot be operated. In this situation the Central Processor Unit 10 start sending photo image of vehicle driver, driver fingerprints and vehicle location data by Data Radio transmitter 18 via Data Radio translator 38 located everywhere as needed to Data Radio receiver 40 connected with Personal Computer 42 located in police office, traffic control office and vehicle owner place. Personal Computer 42 gives vehicle location coordinates, and prints vehicle drivers photo picture and fingerprints.

Tank Cover Code Lock 36 generate and send an electrical signal to Central Processor Unit 10. Central Processor Unit 10 enable to store and operate data from Tank Cover Code Lock 36. When Tank Cover Code Lock 36 numeric code is entered the Central Processor Unit 10 checks this code to match with stored code and if it is matched the Central Processor Unit 10 unlocks Tank Cover Code Lock 36.

Gasoline Quality Analyzer 30 send a gasoline chemical data to Central Processor Unit 10. Central Processor Unit 10 matches gasoline chemical data with stored chemical dates of all market gasoline brands and shows resulting information on Vehicle Information Display 44. A car owner can reed Display 44 and see if ordered Gasoline brand is not matched with a gasoline industry standard.

Gasoline Volume Sensor 32 generate and send data about existing tank gasoline volume to Vehicle Information Display 44 via Central Processor Unit 10.

Gasoline Entry Volume Sensor 34 generates and sends data about a tank entered gasoline volume to Vehicle Information Display 44 via Central Processor Unit 10.

Accordingly, it can be seen that my Multi Element Security System enables to resolve vehicle stealing problems by adding more security data locks such as Fingerprints Entry Device 14, Photo Camera 16, and send all this dates including vehicle location coordinates straight to Personal Computer 42 in Traffic control office, police department and vehicle owner place. In addition System enables to resolve a gasoline stealing problem by giving to vehicle owner information about the tank entered gasoline volume, tank existing gasoline volume and entered gasoline quality. Additional Protection is Tank Cover Code Lock 36 to prevent unauthorized access to a gasoline tank.

Although the description above contains many specificities, these should not be construed as limiting the scope of the invention but as merely providing illustrations of some of the presently preferred embodiments of this invention. Various other embodiments and ramifications are possible within its scope. For example, Date Radio translator 38 may be located near major roads or on a space satellite.

Thus the scope of the invention should be determined by the appended claims and their legal equivalents, rather than by the examples given.

What is claimed is:

1. A multi element security system for a vehicle and the like, comprising a central processing unit for storing driver's fingerprint data and driver's image data; Fingerprints Entry means and photo image entry means connected with said central processing unit so that when a key ignition lock is inserted fingerprints data and photo image data of a person inserting the key ignition lock are transmitted to the central processing unit and compared with the stored data to determine whether the person inserting the key ignition lock is an unauthorized driver or not; means for connecting said central processing unit with a vehicle battery and a motor pump, so that said vehicle battery and said motor pump are operated only when it is determined that the person is the authorized driver; means for transmitting data about the fingerprints and the photo image of the person to a designated place when it is determined that he is not the authorized driver; a tank cover code lock connected with said central processing unit to generate and send a signal corresponding to a predetermined tank cover coat, so that the tank cover can be opened only when a code is introduced by a person which corresponds to the tank cover code in said central processing unit; a gasoline quality analyzer which analyzes a quantity of gasoline introducable into a tank and connected to said central processing unit so that when a quality of gasoline introduced into the gas tank is not matched with the required quality, a signal is provided on a display; means generating data about an existing tank gasoline volume; and means producing data about a volume of gasoline introduced during filing a gas tank to determine accuracy of the volume of gasoline introduced into the gas tank; and a vehicle information display displaying data about the existing tank gasoline volume and the introduced gasoline volume.

2. A multi element security system for a vehicle and the like, comprising a central processing unit for storing driver's fingerprint data and drivers image data; Fingerprints Entry means and photo image entry means connected with said central processing unit so that when a key ignition lock is inserted fingerprints data and photo image data of a person inserting the key ignition lock are transmitted to the central processing unit and compared with the stored data to determine whether the person inserting the key ignition lock is an unauthorized driver or not; means for connecting said central processing unit with a vehicle battery and a motor pump, so that said vehicle battery and said motor pump are operated only when it is determined that the person is the authorized driver; means for transmitting data about the fingerprints and the photo image of the person to a designated place when it is determined that he is not the authorized driver; means for determining a vehicle location and transmitting data about the determined vehicle location to the designated place; a personal computer provided in said designated place and outputting the data about the fingerprints and the photo image of the person; an ignition codet block for entering a numerical code in said central processing unit for ignition purposes; a tank cover code lock connected with said central processing unit to generate and send a signal corresponding to a predetermined tank cover coat, so that the tank cover can be opened only when a code is introduced by a person which corresponds to the tank cover code in said central processing unit; a gasoline quality analyzer which analyzes a quality of gasoline introducable into a gas tank and connected to said central processing unit so that when a quality of gasoline introduced into the gas tank is not matched with the required quality, a signal is provided on a display; means generating data about an existing tank gasoline volume; and means producing data about a volume of gasoline introduced during filing a gas tank to determine accuracy of the volume of gasoline introduced into the gas tank; and a vehicle information display displaying data about the existing tank gasoline volume and the introduced gasoline volume.

\* \* \* \* \*